United States Patent
Arpat et al.

(10) Patent No.: US 10,679,147 B2
(45) Date of Patent: Jun. 9, 2020

(54) SENTIMENT POLARITY FOR USERS OF A SOCIAL NETWORKING SYSTEM

(71) Applicant: Facebook, Inc., Menlo Park, CA (US)

(72) Inventors: Guven Burc Arpat, Los Altos, CA (US); Saiyad Shah, Fremont, CA (US); Srikant Ramakrishna Ayyar, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 262 days.

(21) Appl. No.: 15/693,235

(22) Filed: Aug. 31, 2017

(65) Prior Publication Data

US 2018/0012146 A1    Jan. 11, 2018

Related U.S. Application Data

(63) Continuation of application No. 14/023,136, filed on Sep. 10, 2013.

(51) Int. Cl.
*G06N 20/00* (2019.01)
*G06Q 10/10* (2012.01)
*G06Q 50/00* (2012.01)

(52) U.S. Cl.
CPC ............. *G06N 20/00* (2019.01); *G06Q 10/10* (2013.01); *G06Q 50/01* (2013.01)

(58) Field of Classification Search
CPC ........ G06N 20/00; G06N 20/10; G06N 20/20; G06Q 10/10; G06Q 50/01; G06Q 50/30
See application file for complete search history.

(56) References Cited

U.S. PATENT DOCUMENTS

| 8,082,288 | B1 | 12/2011 | Yeh et al. |
| 2006/0069589 | A1 | 3/2006 | Nigam et al. |
| 2010/0306123 | A1 | 12/2010 | Cai et al. |
| 2011/0035283 | A1 | 2/2011 | Min et al. |

(Continued)

FOREIGN PATENT DOCUMENTS

| JP | 2011-040033 A | 2/2011 |
| JP | 2011-248831 A | 12/2011 |

OTHER PUBLICATIONS

Canadian Intellectual Property Office, Office Action, Canadian Patent Application No. 2,918,428, dated Dec. 18, 2017, eight pages.

(Continued)

*Primary Examiner* — Shane D Woolwine
(74) *Attorney, Agent, or Firm* — Fenwick & West LLP

(57) ABSTRACT

A social networking system infers a sentiment polarity of a user toward content of a page. The sentiment polarity of the user is inferred based on received information about an interaction between the user and the page (e.g., like, report, etc.), and may be based on analysis of a topic extracted from text on the page. The system infers a positive or negative sentiment polarity of the user toward the content of the page, and that sentiment polarity then may be associated with any second or subsequent interaction from the user related to the page content. The system may identify a set of trusted users with strong sentiment polarities toward the content of a page or topic, and may use the trusted user data as training data for a machine learning model, which can be used to more accurately infer sentiment polarity of users as new data is received.

29 Claims, 7 Drawing Sheets

(56) References Cited

U.S. PATENT DOCUMENTS

| | | |
|---|---|---|
| 2011/0295787 A1 | 12/2011 | Tateno |
| 2011/0302006 A1 | 12/2011 | Avner et al. |
| 2012/0101805 A1 | 4/2012 | Barbosa et al. |
| 2012/0110071 A1 | 5/2012 | Zhou et al. |
| 2012/0166530 A1 | 6/2012 | Tseng |
| 2012/0197903 A1 | 8/2012 | Lu et al. |
| 2013/0018954 A1 | 1/2013 | Cheng |
| 2013/0103667 A1 | 4/2013 | Minh |
| 2013/0110928 A1 | 5/2013 | Ghosh et al. |
| 2013/0124191 A1 | 5/2013 | Louis et al. |
| 2013/0166725 A1 | 6/2013 | Liyanage et al. |
| 2013/0166726 A1* | 6/2013 | Boldyrev .............. G06Q 50/01 709/224 |
| 2013/0173254 A1 | 7/2013 | Alemi |
| 2013/0212059 A1 | 8/2013 | Ameri-Yahia et al. |
| 2013/0290232 A1 | 10/2013 | Tsytsarau et al. |
| 2013/0304686 A1* | 11/2013 | Antin .................... G06Q 10/10 706/46 |
| 2014/0101064 A1 | 4/2014 | Bedard et al. |
| 2014/0156451 A1 | 6/2014 | Goldman |
| 2015/0058416 A1* | 2/2015 | Felt ........................ H04L 67/22 709/204 |

OTHER PUBLICATIONS

Japan Patent Office, Office Action, Japanese Patent Application No. 2016-540901, dated Jan. 8, 2019, thirteen pages.

Japanese Patent Office, Office Action, Japanese Patent Application No. 2016-540901, dated Jun. 19, 2018, eleven pages.

United States Patent and Trademark Office, Before the Patent Trial and Appeal Board, Examiner's Answer, U.S. Appl. No. 14/023,136, dated Apr. 19, 2018, twenty-one pages.

PCT International Search Report and Written Opinion, PCT Application No. PCT/US2014/051713, dated Dec. 2, 2014, ten pages.

United States Advisory Action, U.S. Appl. No. 14/023,136, dated Nov. 14, 2016, three pages.

United States Office Action, U.S. Appl. No. 14/023,136, dated Jun. 3, 2016, 26 pages.

United States Office Action, U.S. Appl. No. 14/023,136, dated Nov. 30, 2015, 24 pages.

* cited by examiner

SENTIMENT POLARITY FOR USERS OF A SOCIAL NETWORKING SYSTEM

CROSS REFERENCE TO RELATED APPLICATIONS

This application is a continuation of co-pending U.S. application Ser. No. 14/023,136, filed Sep. 10, 2013, which is incorporated by reference in its entirety.

BACKGROUND

This invention relates generally to social networking, and in particular to inferring sentiment polarity for users of a social networking system.

Social networking systems commonly provide mechanisms allowing users to interact within their social networks. A social networking system user may be an individual or any other entity, such as a business or other non-person entity. Social networking system information that is tracked and maintained by a social networking system may be stored as a social graph, which includes a plurality of nodes that are interconnected by a plurality of edges. A social graph node may represent a social networking system object that can act on and/or be acted upon by another node. A social networking system object may be, for example, a social networking system user, non-person entities, content items, groups, social networking system pages, events, messages, subjects (such as persons, places, things, abstract ideas or concepts), or other social networking system objects, such as movies, bands, or books.

An edge between nodes in a social graph represents a particular kind of connection between the nodes, which may result from an action that was performed by one of the nodes on the other node. Examples of such actions by a social networking system user include listing social networking system objects in a user profile, subscribing to or joining a social networking system group or fan page, sending a message to another social networking system user, making a purchase associated with a social networking system node, commenting on a content item, or RSVP'ing to an event.

As social networking system users interact with pages in the social networking system, e.g., by commenting on page content, posting to the page, liking the page, or other interactions, valuable information could be determined from the interactions if the sentiment of the user toward the content (e.g., positive or negative) as known. For example, page owners may desire to better understand user reaction to the page content, and advertisers may be interested in a user's sentiment toward a particular page or topic. Therefore, there is a need for a reliable method for determining the sentiment of a user of the social networking system toward a page or topic, based on the user's interactions with a page or topic.

SUMMARY

Embodiments of the invention provide the ability to infer a sentiment polarity of a user of the social networking system toward a page or topic in the social networking system based on the user's interactions with the page or topic. In one embodiment, content of a page in the social networking system is identified. For instance, the content of the page may include text, pictures, video clips, audio clips, etc. In response to identifying text content on a page, a topic may be extracted from the text content of the page. For instance, a topic may be football, a recent event in the news, a particular food, or any other suitable topic, which may cover content spanning more than a single page. Information about an interaction between a user of the social networking system and the page or topic is received. For example, the interaction may indicate that the user likes the page, crosses out the page, shares the page, hides the page, reports the page, comments on the page, etc. The system then infers a sentiment polarity of the user based on the received information about the interaction, e.g., a positive sentiment of the user toward the content for a "like." The system then also associates the inferred sentiment polarity with any second or subsequent interaction from the user that is related to the content of the page or the topic. For example, the user makes a comment on a page he has previously liked, and therefore the system associates the inferred sentiment polarity (positive sentiment polarity associated with the like) with the comment as well.

The social networking system may infer the sentiment polarity of a user using a sentiment engine in conjunction with a machine learning module. In one embodiment, the system identifies a set of trusted users associated with the content of the page. A trusted user is one who possesses a strong sentiment polarity (negative or positive) toward the content of the page. The system determines a data set associated with each trusted user. The data set includes information about interactions by the trusted user on the page that result in the trusted user's known sentiment polarity. The aggregate data sets from trusted users are then used as a training set to train a machine learning model, e.g., via a machine learning algorithm. The resulting predictive model then may be used by the sentiment engine to infer sentiment polarities of users of the social networking system toward page content as the users provide new interaction input.

The figures depict various embodiments of the present invention for purposes of illustration only. One skilled in the art will readily recognize from the following discussion that alternative embodiments of the structures and methods illustrated herein may be employed without departing from the principles of the invention described herein. It is noted that wherever practicable similar or like reference numbers may be used in the figures and may indicate similar or like functionality.

DETAILED DESCRIPTION

Figure 1:
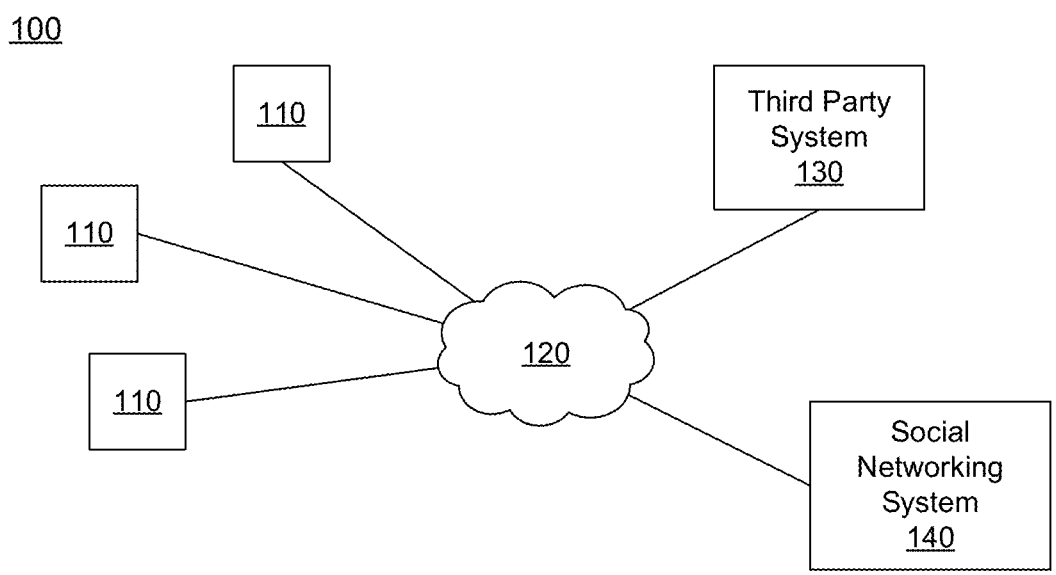
FIG. 1 is a block diagram of a system environment in which a social networking system operates, according to one embodiment.
Figure 2:
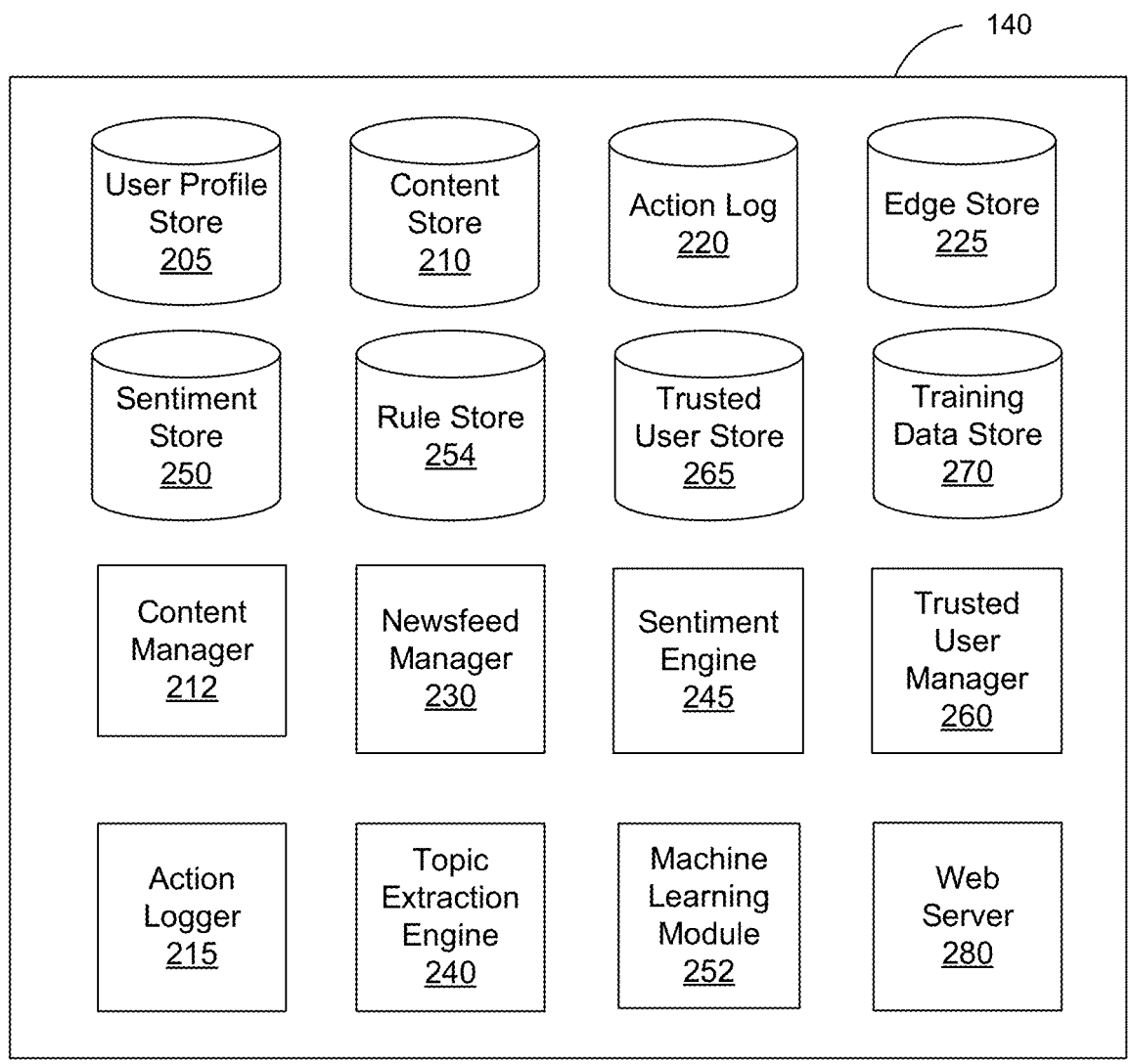
FIG. 2 is a block diagram of a social networking system suitable for inferring a sentiment polarity of a user toward content of a page, according to one embodiment.
Figure 3:
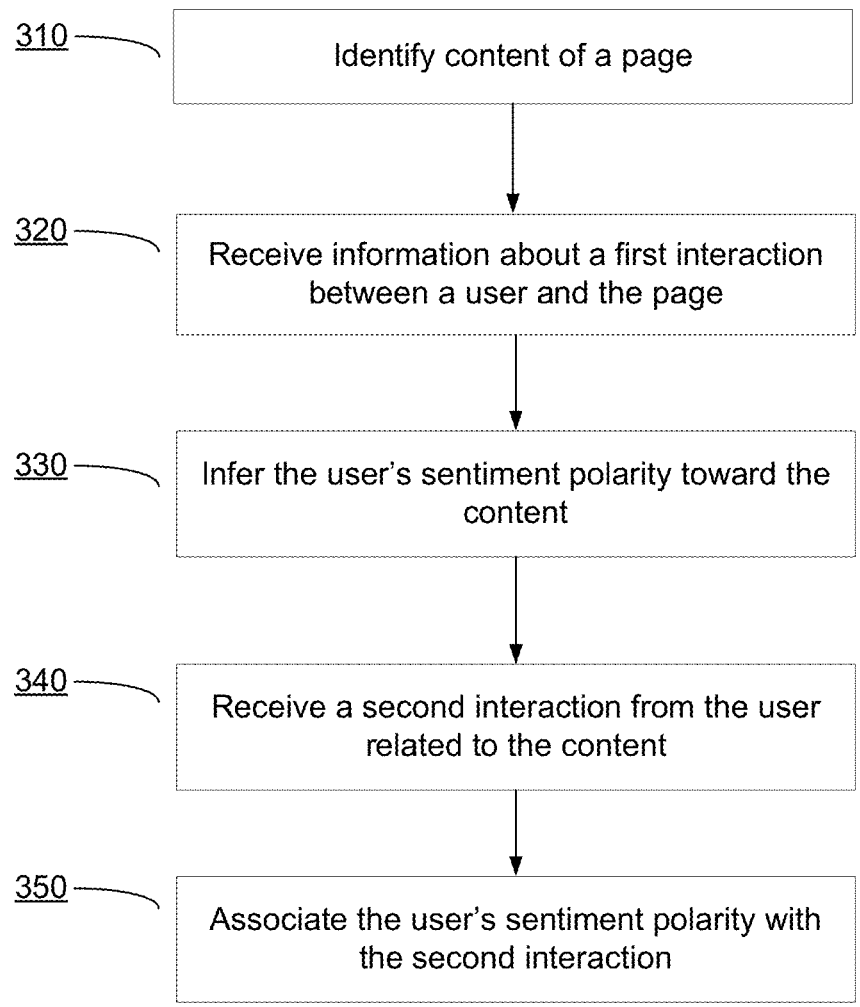
FIG. 3 is a flow chart illustrating a process for inferring a sentiment polarity of a user toward the content of a page and associating the sentiment polarity with a second interaction from the user related to the content, according to one embodiment.
Figure 4:
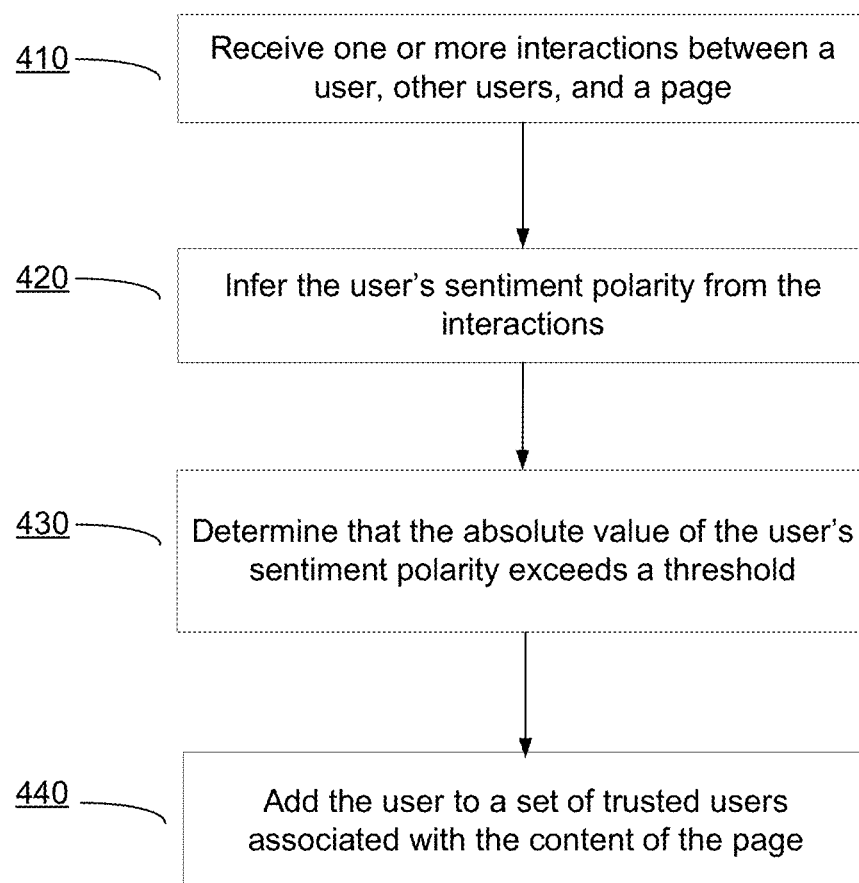
FIG. 4 is a flow chart illustrating a process for identifying a trusted user associated with the content of a page, according to one embodiment.

Embodiments of the invention provide the ability to infer sentiment polarity of a user of a social networking system toward a page or topic based on the user's interactions with the page or topic, using a rule-based or model-based approach. FIG. 3 is a flowchart of a method for inferring sentiment polarity, and FIGS. 1 and 2 are diagrams of a system capable of performing the method. FIG. 4 illustrates a process of selected certain users as "trusted users," whose data may be used as training date for a machine learning model, as described in conjunction with FIGS. 5 and 6. FIG. 7 provides a use case for the sentiment polarity data, showing various analytics that can be used to understand user reaction to page content and to predict future user interactions with the page.

System Architecture

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smart phone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

FIG. 2 is an example block diagram of an architecture of the social networking system 140. The social networking system 140 shown in FIG. 2 includes a user profile store 205, a content store 210, a content manager 212, an action logger 215, an action log 220, an edge store 225, a newsfeed manager 230, a topic extraction engine 240, a sentiment engine 245, a sentiment store 250, a machine learning module 252, a rule store 254, a trusted user manager 260, a trusted user store 265, a training data store 270, and a web server 280. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140.

The content manager 212 identifies content represented by each object stored in the content store 210. The identified content may be later used by users and/or other modules in the social networking system. For example, the content manager 212 identifies text content of a page either within or external to the social networking system. The identified text content is passed on to a topic extraction engine which extracts a topic from the text content. In addition, a user may share the text content of the page with other users, and a sentiment engine is called upon to determine the sentiment of the user toward the text content of the page. Other types of content—e.g., status update, photograph, video, etc.—may also be identified by the content manager 212.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences. In one embodiment, data from the action log 220 is used to infer a user's sentiment polarity (e.g., positive or negative) toward content of a page.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in edge store 225 or may select candidate stories included in content store 210. One or more of the candidate stories are selected and presented to a user by the newsfeed manager 230.

For example, the newsfeed manager 230 receives a request to present one or more stories to a social networking system user. The newsfeed manager 230 accesses one or more of the user profile store 105, the content store 110, the action log 120, and the edge store 130 to retrieve information about the identified user. For example, stories or other data associated with users connected to the identified user are retrieved. The retrieved stories or other data is analyzed by the newsfeed manager 230 to identify content likely to be relevant to the identified user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user. In one approach, the selected candidate stores are sponsored stories which are messages from users connected to the identified user about them engaging with a page, an application, or an event that a business, an organization, or an individual has paid to highlight.

In various embodiments, the newsfeed manager 230 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 205. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, the newsfeed manager 230 may analyze stories received by the social networking system 140 from various users and obtains information about user preferences or actions from the analyzed stories. This information may be used to refine subsequent selection of stories for newsfeeds presented to various users. For example, the newsfeed manager 230 may use this information to refine selection of sponsored stories to include in a newsfeed.

The social networking system 140 includes a topic extraction engine 240, which identifies one or more topics associated with objects in the content store 210. To identify topics associated with content items, the topic extraction engine 240 identifies anchor terms included in a content item and determines a meaning of the anchor terms as further described in U.S. application Ser. No. 13/167,701 entitled "Inferring Topics From Social Networking System Communications," filed Jun. 24, 2011, which is hereby incorporated by reference in its entirety. For example, the topic extraction engine 240 determines one or more topics associated with a content item maintained in the content store 210. The one or more topics associated with a content item are stored and associated with an object identifier corresponding to the content item. In various embodiments, associations between object identifiers and topics are stored in the topic extraction engine 240 or in the content store 210 to simplify retrieval of one or more topics associated with an object identifier or retrieval of object identifiers associated with a specified topic. Structured information associated with a content item may also be used to extract a topic associated with the content item.

The social networking system 140 includes a sentiment engine 245, which determines a sentiment and/or sentiment polarity of users toward topics or page content. In one embodiment, it is used to infer sentiment polarities of users toward topics or page content of the social networking system. The inferred sentiment polarity includes not just whether the user's action demonstrates a positive or negative sentiment toward a topic or page content, but also the degree of negative or positive sentiment toward the topic of content. For example, the user action may be related to an object in the social networking system such as a page, a comment from another user, a sponsored story, a movie, an event, etc. A user action may indicate a positive or negative sentiment toward the object. For example, a user may "like" a page, which is an action indicating a positive sentiment, for which the system would infer a positive sentiment polarity. The sentiment engine 245 gathers information about these actions by the user, e.g., as stored in the action log 220 and/or the edge store 225, and uses the gathered information to infer the user's sentiment polarity toward the object.

In another embodiment, the sentiment engine 245 works in conjunction with the topic extraction engine 240 to infer a user's sentiment polarity toward an extracted topic of text content of a page. The sentiment engine 245 also determines the user's sentiment toward the text content (e.g., positive or negative) using, for example lexicon-based analysis or a Minutiae-based sentiment classifier. For example, if a user posted a negative comment about a page, the text of a comment could be analyzed to determine that the comment was negative, in which case the action would indicate a negative sentiment, and the system would infer a negative sentiment polarity. Alternatively, a bag-of-words sentiment analysis could be used to determine sentiment of the comment. In various embodiments, the sentiment engine 245 works in conjunction with a predictive model, a set of rules and/or heuristics, or both, to determine the degree of the polarity. For example, a rule may dictate that a "like" has a high positive polarity, e.g., +0.9 on a 0 to +1 scale, such that all "like" actions are assigned a sentiment polarity of +0.9. The use of a rule store 254, is described below, and an exemplary predictive model, e.g., 665, is described below in conjunction with FIG. 6. In other embodiments, any other method of determining the degree of polarity also may be used, and are within the scope of the present invention.

In some cases, the sentiment engine 245 works with the rule store 254 to infer a user's sentiment polarity toward content of a page. In other cases, the sentiment engine 245 works with the machine learning module 252, for example if a predictive model (e.g., 665) is available for use. The sentiment engine 245 may use a hybrid approach which combines the rule-based approach and the model-based approach for certain user interactions. For example, the sentiment engine 245 works with the rule store 254 to infer a first sentiment polarity of a user based on a first interaction between the user and a page, and works with the machine learning module 252 to infer a second sentiment polarity of the user based on five other interactions between the user and the page. The sentiment engine 245 then combines the first sentiment polarity and the second sentiment polarity using, for example a weighted sum, to obtain a final sentiment polarity of the user.

The sentiment store 250 stores user sentiment and/or sentiment polarity information, either inferred by the sentiment engine 245 or obtained through other means (e.g., user input). The sentiment store 250 stores the inferred sentiment polarity data of users in the social networking system. For example, a user is associated with multiple sentiment polarity data, each sentiment polarity value corresponding to the content on a page and/or a certain topic. In some cases, the sentiment engine 245 uses lexicon-based analysis to analyze a user's comment/post to infer the user's sentiment polarity (e.g., by counting positive and negative words in the user's comment/post). These sentiment polarity data are stored in the sentiment store 250 as well. Sentiment data not tied to inferred sentiment polarity is stored in the sentiment store 250 as well. The stored sentiment data about one or more users is retrieved by the sentiment engine 245 to infer a user's sentiment polarity.

In one embodiment, the machine learning module 252 enables a machine learning model that is trained via a machine learning algorithm (e.g., 650), and maintains the resulting predictive model (e.g., 665). For example, the machine learning module 252 uses a training data set to train the model. The output from the machine learning module 252 is a trained model (i.e., predictive model 665), which can be used by the sentiment engine 245 to infer a user's sentiment polarity. This is referred to as the model-based approach, in contrast with the rule-based approach described below. The model-based approach is described in greater detail in conjunction with FIGS. 5 and 6.

The rule store 254 primarily stores predefined rules which can be used by the sentiment engine 245 to infer a user's sentiment polarity. For example, a rule may be "if a user likes a page, the user's sentiment polarity is 90% positive toward the content of the page." Another rule may be "if a user has greater than a threshold number/percentage of friends who like a page (e.g., >50%), the user's sentiment polarity is 60% positive toward the content of the page." In one embodiment, the rules are stored in a look-up table or other structured information format in the rule store 254 to facilitate easy retrieval. The rule store 254 stores other rules in some embodiments, e.g., rules for determining which users can be designated as trusted users.

The trusted user manager 260 identifies a set of trusted users associated with a topic or the content of a page. Trusted users are users with strong positive or negative sentiment polarities toward the content or topic. In one embodiment, a positive trusted user is a user whose sentiment polarity is greater than a threshold value (e.g., more than 90% positive) toward the content of the page, and a negative trusted user is a user whose sentiment polarity is greater than a threshold value (e.g., more than 85% negative) toward the content of the page. The positive and negative thresholds may be the same or different for a topic or page content; the examples provided above are just examples. The trusted user manager 260 identifies trusted users via users' interactions with the page. For example, the trusted user manager 260 may access interaction information about a user as stored in the action log 220 and/or user sentiment information as stored in the sentiment store 250. In one embodiment, the trusted user manager 260 accesses the rule store 254 to identify a rule for establishing a user as trusted, e.g., to identify thresholds as described above. The trusted user manager 260 creates a data set for each trusted user corresponding to a topic or page, which includes the trusted user's interactions with the topic or page together with the trusted user's sentiment polarity. These data sets can be used by the machine learning module 252 to train a machine learning model. In one embodiment, the trusted user manager 260 keeps track of interactions of trusted users over time, and updates the trusted user store 265 with changes to the group of trusted users associated with a topic or page.

The trusted user store 265 stores information about users identified as trusted by the trusted user manager 260. The trusted user store 265 may store trusted user information according to the content of a page, the topic, positive/negative sentiment polarity, etc. For example, a user may be a positive trusted user (i.e., a user with an assumed positive sentiment polarity) on the content of a page, but a negative trusted user (i.e., a user with an assumed negative sentiment polarity) on a different topic.

The training data store 270 stores the data sets associated with trusted users that are generated by the trusted user manager 260. As described, the data set for a trusted user includes the trusted user's interactions with a page together with the trusted user's sentiment polarity toward a topic or the content of the page. The aggregate data sets form a training set for the machine learning module 252. The training data store 270 stores various training sets for a variety of pages, content items, topics, etc.

The web server 280 links the social networking system 140 via the network 120 to the one or more client devices 110, as well as to the one or more third party systems 130. The web server 280 serves web pages, as well as other web-related content, such as JAVA®, FLASH®, XML, and so forth. The web server 280 may receive and route messages between the social networking system 140 and the client device 110, for example, instant messages, queued messages (e.g., email), text messages, short message service (SMS) messages, or messages sent using any other suitable messaging technique. A user may send a request to the web server 280 to upload information (e.g., images or videos) that are stored in the content store 210. Additionally, the web server 280 may provide application programming interface (API) functionality to send data directly to native client device operating systems, such as IOS®, ANDROID™, WEBOS® or RIM®.

Inference of Sentiment Polarity

FIG. 3 is a flow chart illustrating a process for inferring a sentiment polarity of a user toward the content of a page and associating the sentiment polarity with a second interaction from the user related to the content. As used herein, the page may be a web page, an application interface or display, a widget displayed over a web page or application, a box or other graphical interface, an overlay window on another page (whether internal or external to a social networking system), or a web page external to the social networking system with a social networking system plug in or integration capabilities.

First, a page's content is identified 310, e.g., by content manager 212. For example, the page's content may include text, videos, photographs, maps, links, advertisements, sponsored stories, etc. The above list of content is non-exhaustive, and the content may include any content that exists on a page. The identified 310 content may be later used by users and/or other modules in the social networking system. For example, the content manager 212 identifies text content of a page, and the topic extraction engine 240 is called upon to extract a topic from the text content, for example using lexicon-based analysis.

The social networking system then receives 320 information about a first interaction between a user of the social networking system and the page or topic. The interaction typically is received by the action logger 215. In some cases, the interaction may be recorded in the action log 220 or the edge store 225, and later retrieved. For example, the interaction may include that the user likes the page, is a fan of the page, crosses-out the page, unlikes the page, reports the page, shares the page, views the page, hides the page, comments on the page, etc. The above list of interactions is non-exhaustive, and the interaction described here may be any interaction between a user and the page.

The user's sentiment polarity may be inferred 330 toward the topic or content of the page based on the received information about the interaction, e.g., by sentiment engine 245. In one embodiment, first a topic is extracted from text content, e.g., by topic extraction engine 240. A sentiment of the user toward the text content is then determined based on the received interaction, and then the user's sentiment polarity is inferred 330 toward the topic corresponding to the user's sentiment toward the text content.

Interactions of different types may have different impacts on the way that the user's sentiment polarity is inferred 330. As noted above, possible models for determining sentiment polarity from an action include a rule-based model and a predictive model-based model. For example, a rule (e.g., stored in rule store 254) may indicate that a "share" action has a strongly positive sentiment polarity, while a "like" action has a relatively weaker positive sentiment polarity. Similarly, a "cross out" action may have a strongly negative sentiment polarity, while a "hide" action has a weakly negative sentiment polarity.

The inferred 330 sentiment polarity provides a positive or negative value for the content of the page (or an extracted topic extracted) based on a specific user. In one embodiment, the sentiment polarity may be a number ranging from −1 to 1. As a user's sentiment polarity approaches 1, the user approaches a maximally positive sentiment toward the topic or content of the page. As a user's sentiment polarity approaches −1, the user approaches a maximally negative sentiment toward the topic or content of the page. A sentiment polarity of 0 is a neutral sentiment (i.e., neither positive nor negative) toward the topic or content of the page, although a 0 value sentiment would be unlikely to occur in practice unless the user had no interaction with the topic or page. As discussed above, some interactions have a stronger polarity than others, based on rules or based on a predictive model. For example, a "like" may have a strong positive sentiment polarity of 0.75; a share may have a stronger positive sentiment polarity of 0.9; a "cross out" may have a very high negative sentiment polarity of −0.9, a "hide" may have a slightly lower negative sentiment polarity of −0.6; etc. In one embodiment, a user is inferred to have a sentiment polarity of +1 (i.e., maximally positive) if the user is a fan of the page.

There also can be "neutral" comments and interactions, especially if the text is factual (e.g., "Today's SUVs mostly run on freeways.") or if the content is balanced (e.g., "This movie is great fun all the way till the last 15 minutes, but it has a horrible ending."). Other equivalent representations of the sentiment polarity will be apparent.

In some cases, a user's sentiment polarity is inferred 330 via responses by the user to the actions of other users in the social networking system of known sentiment. For example, a first user makes a negative comment on a page. A second user "likes" the negative comment by the first user and adds a post related to the content of the page. A third user reports the post by the second user. In this example, the first user's sentiment polarity would be inferred 330 to be negative based on the content of the negative comment, the second user's sentiment polarity would be inferred 330 to be the same as or similar to the first user's (since he "liked" the negative comment), and the third user's sentiment polarity would be inferred 330 to be the opposite sentiment polarity (i.e., positive) from the second user's, since he reported the second user's (negative) post.

In another example, the social networking system receives information about separate interactions between users with whom the user has established a connection in the social networking system (i.e., the user's friends) and a page. For example, the user's friends may have liked, reported, commented on the page, etc. The user's sentiment polarity may be inferred 330 based on the information about the separate interactions, e.g., because a few of the user's friends like the page, and the user is likely to share his friends' views, the sentiment engine 245 may infer a slightly positive sentiment polarity for the user toward the page, even if he's never visited the page directly.

In one embodiment, the user's sentiment polarity is inferred 330 by the sentiment engine 245 in conjunction with the rule store 254. The rule store 254 stores predefined rules for use by the sentiment engine 245. For example, if a user likes the page, a rule from the rule store 254 may indicate an inference that the user has a positive sentiment polarity (e.g., 0.9) toward the content of the page. The sentiment engine 245 retrieves these rules from the rule store 254 according to one embodiment, and determines inferences from them accordingly. In another embodiment, the user's sentiment polarity is inferred 330 by sentiment engine 245 in conjunction with machine learning module 252.

Referring again to FIG. 3, the social networking system then receives 340 a second interaction (e.g., via the action logger 215) from the user related to the topic or page content. As with the first interaction of step 320, the interaction is received by the action logger 215. For example, the user may make another comment on the page, share some content of the page, like/comment on another user's comment on the page, comment on another page which has related or the same content of the page, post a wall post related to the topic, etc. In some cases, the second interaction happens right after, or within a predetermined time frame (e.g., one week, two months, etc.) following the first interaction at step 320. In other cases, the second interaction happens prior to the first interaction at step 320, but is retrieved later by the social networking system. For instance, a user makes a comment on the page before the user likes the page. The sentiment engine may treat the "like" as the first interaction at step 320, and the user's comment as the second interaction at step 340, even though the "liked" happened second chronologically.

The social networking system then associates 350 the user's inferred sentiment polarity with the second interaction (e.g., via the sentiment engine 245). For example, if the user's first interaction is liking the page and a user's second interaction is a comment posted by the user on the page, in sentiment polarity of the like (i.e., positive) is associated 350 with the second interaction as well, even with no knowledge of the content of the text of the comment. In another embodiment, using a lexicon-based analysis the social networking system determines that the second interaction (comment) is weakly positive and infers 330 a sentiment polarity of 0.1 for the comment. Using the previously inferred 330 sentiment polarity of the user toward the page from liking it (e.g., 0.8), the comment from the user is associated 350 with the same positive sentiment polarity of 0.9, replacing the weak positive sentiment polarity determined from the lexicon-based analysis. This process effectively boosts understanding of the user's comment by the social networking system.

In some cases, the second interaction does not have any text content (e.g., a "share with no comment"). The sentiment engine 245 may further boost the understanding of the second interaction from the previously inferred sentiment polarity by associating 350 the previous sentiment polarity with the second interaction.

Some users of the social networking system may have very high (positive or negative) sentiment polarity toward a topic or page, such that they become "trusted" by the social networking system. FIG. 4 is a flow chart illustrating a process for identifying a trusted user associated with the content of a page. In other words, FIG. 4 illustrates how the trusted user manager 260 determines which users are trusted. The first two steps are similar to steps 320 and 330 of FIG. 3, namely the social networking system receives 410 one or more interactions between a user and a page, and infers 420 the user's sentiment polarity from received one or more interactions (e.g., via the sentiment engine 245). The social networking system then determines 430 whether the absolute value of the user's sentiment polarity exceeds a minimum threshold necessary to be considered trusted. For illustrative purposes, the threshold may be the same magnitude for both positive and negative sentiment polarities. In other examples, the threshold for positive sentiment polarity may not be equal to that for negative sentiment polarity. If the absolute value of the user's sentiment polarity is determined 430 to exceed the threshold, the social networking system adds 440 the user to a set of trusted users associated with the content of the page (or topic). On the other hand, if it is determined 430 that the absolute value of the user's sentiment polarity does not exceed the threshold, the user will not be added to the set of trusted users. The set of trusted users are stored in the trusted user store 265.

Figure 5:
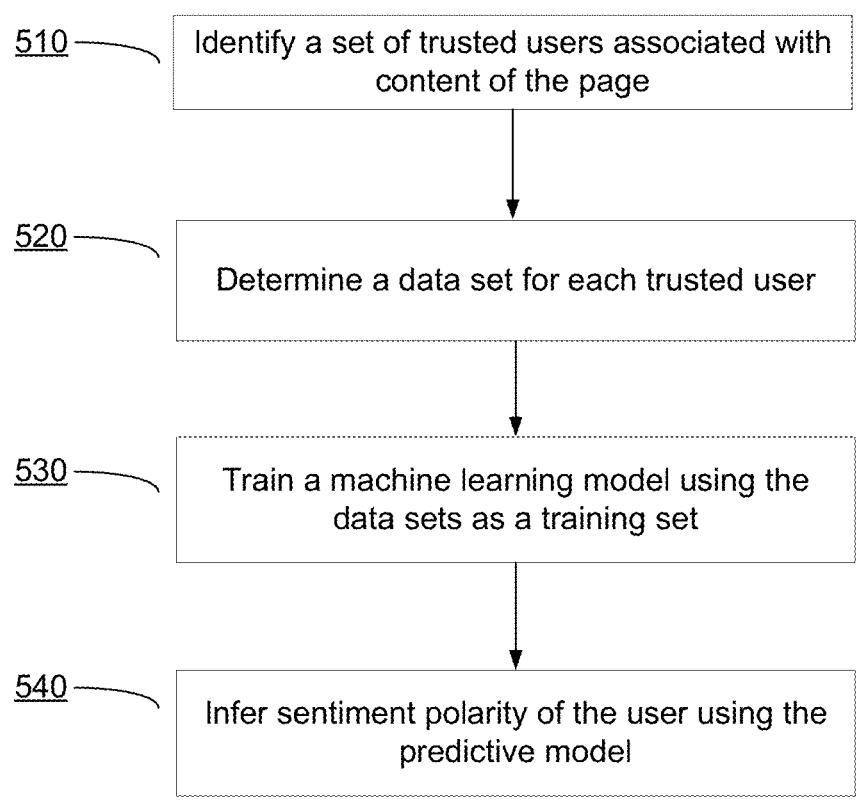
FIG. 5 is a flow chart illustrating a process for training a machine learning model and using the trained machine learning model to infer a sentiment polarity of a user, according to one embodiment.

Once the trusted user manager 260 has identified a sufficient number of trusted users and stored them in the trusted user store 265, the trusted users can be used to train a machine learning model. FIG. 5 is a flow chart illustrating a process for training a machine learning model and using the resulting predictive model to infer sentiment polarity of a user. First, a set of trusted users associated with content of the page (or topic) is identified 510 by the trusted user manager 260. A trusted user may be determined as per FIG. 4 above, or by any other method to produce trusted users that can provide a training data set for the machine learning model. In one embodiment, a positive trusted user is a user with a sentiment polarity above a certain threshold (e.g., 0.9), and a negative trusted user is a user with a sentiment polarity below a certain threshold (e.g., −0.9). The set of comments in conjunction with each comment's sentiment polarity may serve as a training set for a "bag of words" sentiment analyzer, which is a machine learning engine either internal or external to the social networking system. Each trusted user essentially functions as a trusted "labeler" to give his/her own comments sentiment "labels" (i.e., the inferred sentiment polarity of the trusted user). The "bag of words" sentiment analyzer trained using a language-independent training set may operate in a language-independent way.

A data set may then be determined 520 for each trusted user, e.g., by the trusted user manager 260. For example, the data set may include interactions between the trusted user and the page (known input), in conjunction with the trusted user's sentiment polarity (known output). A similar data set is determined for each trusted user. The determined data sets are stored in the training data store 270.

The aggregate data sets form a training set that is used to train 530 a machine learning model, e.g., as orchestrated by machine learning module 252. For example, the machine learning module 252 fetches training sets from the training data store 270, and trains a predictive model (e.g., 665) using supervised machine learning (e.g., machine learning algorithm 650) with the training sets as input. In one embodiment, the training set is independent of language. For example, the training set may include user interactions in various languages. A machine learning model trained using such a language-independent data during training may also be independent of language in operation.

The predictive model is used to infer 540 a user's sentiment polarity, similar to step 330 of FIG. 3. In one embodiment the inferring 540 is performed by the sentiment engine 245.

Figure 6:
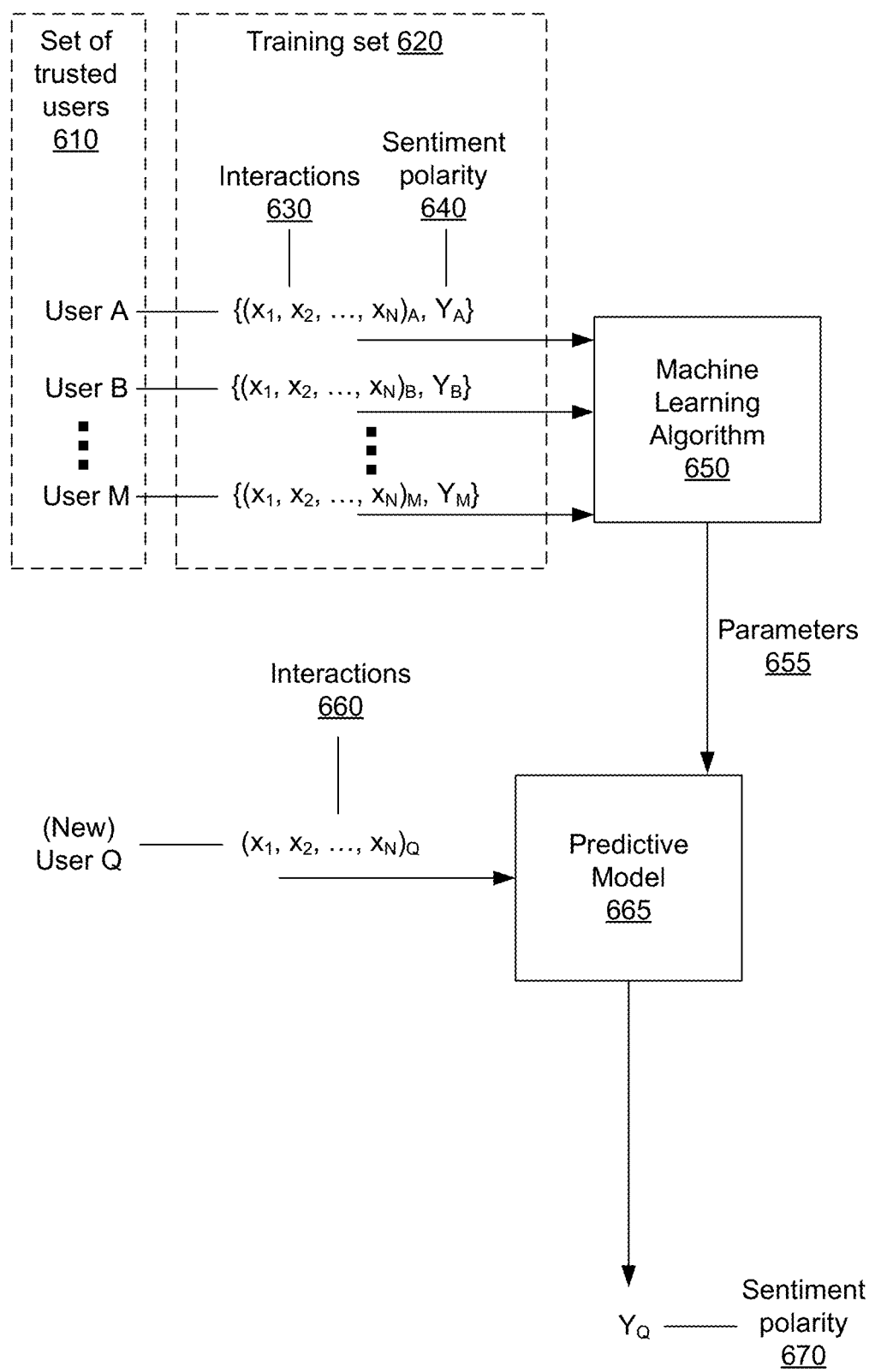
FIG. 6 is a block diagram illustrating training of a machine learning model using a training set from a set of trusted users, and using the trained machine learning model to infer a sentiment polarity of a user, according to one embodiment.

FIG. 6 is a block diagram illustrating the use of a machine learning model for training and then inferring a sentiment polarity of a user toward a topic or page. A set of trusted users 610 associated with the content of a page or a topic is identified, e.g., by trusted user manager 260 or retrieved from trusted user store 265, which includes User A, User B, . . . , User M (i.e., a finite number of users). Each trusted user is associated with a data set, which includes the trusted user's interactions 630 with the page (known input) and the trusted user's sentiment polarity 640 (known output or label). As shown in FIG. 6, User A's interactions are denoted as $(x_1, x_2, \ldots, x_N)_A$, User B's interactions are denoted as $(x_1, x_2, \ldots, x_N)_B$, etc. In one embodiment, $x_1$ represents User A liking a page, $x_2$ represents whether User A commenting on the page, $x_3$ represents the number of the user's friends who like the page, $x_4$ represents the number of positive comments that the user has on the page, $x_5$ represents the number of the user's comments on the page that are liked by other users, $x_6$ represents the number of positive comments on the page liked by the user, and so on. In this example, the trusted user's interactions 630 include interactions among the trusted user, friends of the trusted user, other users in the social networking system, comments on the page, the page itself, other content related to the page, etc.

The training set 620 is an aggregate of the data sets from the set of the trusted users 610. In this example, the training set 620 includes $\{(x_1, x_2, \ldots, x_N)_A, Y_A\}$ from User A, $\{(x_1, x_2, \ldots, x_N)_B, Y_B\}$ from User B, and so on. The sentiment polarity 640 associated with User J is denoted as $Y_J$ (J=1, 2, ..., M), which may be obtained via the rule store 254, a rudimentary (e.g., pre-trained) machine learning model, lexicon-based analysis, etc. The training set 620 is input to the machine learning algorithm 650 to train a machine learning model. For example, the machine learning algorithm 650 may implement a linear function of the interactions to obtain the sentiment polarity. Other functions may also be implemented. In the case of a linear function, the machine learning model may be represented by: $a_1 x_1 + a_2 x_2 + \ldots + a_N x_N + c = Y$, where $\alpha_k$ (k=1, 2, ..., N) are the coefficients and c is a constant. In one embodiment, the coefficients $\alpha_k$ have initial values corresponding to the relative importance of the interactions. For example, a "like" interaction may get a lower weight than a "share" interaction, a "report" interaction may get a higher weight than a "hide" interaction, etc. In some cases, the constant c is used as a fitting value during the training. The process of training the model is carried out by the machine learning module 252 via the machine learning algorithm 650. For example, the initial values may be modified so that the following set of linear equations are simultaneously satisfied:

$$(a_1 x_1 + a_2 x_2 + \ldots + a_N x_N)_J + c = Y_J (J=1, 2, \ldots, M) \quad (1)$$

The output of the training is the determined parameters 655, which collectively form the predictive model 665.

The predictive model 665 can be used by the sentiment engine 245 to infer a user's sentiment polarity. In this example, User Q is the new user under test, and User Q's interactions 660 $(x_1, x_2, \ldots, x_N)_Q$ are input to the predictive model 665. Since the parameters in the predictive model 665 have been determined, the output from the predictive model 665—the inferred sentiment polarity 670 of User Q (denoted as $Y_Q$)—continuing the example from above, is determined by applying the model: $Y_Q = (a_1 x_1 + a_2 x_2 + \ldots + a_N x_N)_Q + c$. Illustratively, this is a detailed example of how the sentiment engine 245 may infer a user's sentiment polarity, a process that is generally shown in the step 330 in FIG. 3.

Once the sentiment polarities of a group of users are inferred, they are stored in the sentiment store 250, and can be analyzed on various occasions.

Figures 7A, 7B, 7C:
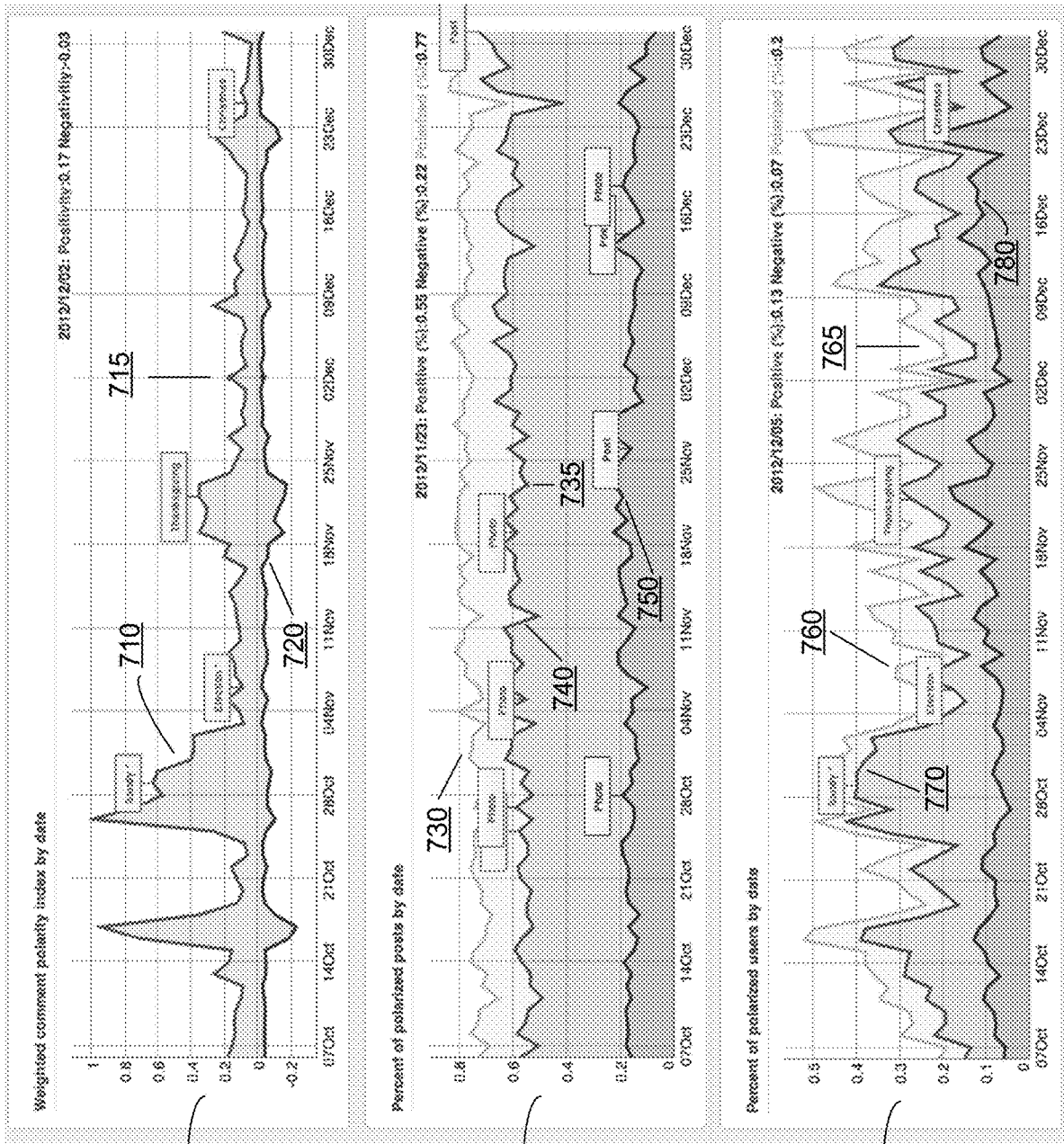
FIGS. 7A-7C are diagrams illustrating three different analytics of sentiment polarities of users toward a retailer page, according to one embodiment.

FIGS. 7A-7C are diagrams of a user interface illustrating three different analytics of sentiment polarities of users toward a retailer page. These three examples provide a use case for how a retailer, who is the owner of the page in the examples of FIGS. 7A-7C, might use sentiment polarity data to better understand user reaction to the retailer's page and specific content thereon, and to thus make decisions about future content. FIG. 7A relates to polarity of comments, FIG. 7B to polarity of posts, and FIG. 7C to polarity of users. FIG. 7A shows weighted average sentiment polarity of comments made by users on the retailer's page as a function of time. Top curve 710 illustrates weighted average sentiment polarity of positive comments (aka, positivity), while bottom curve 720 illustrates weighted average sentiment polarity of negative comments (aka, negativity). In this example, an average positive sentiment polarity of 0.17 and an average negative sentiment polarity of −0.03 are calculated based on user comments on the page on Dec. 2, 2012, a date indicated by point 715 on curves 710 and 720. The user interface shown allows the user of the analytics page the ability to move the point 715 to various locations representing dates, to provide a more detailed view of the sentiment polarity data for that date. A high positive sentiment polarity in conjunction with a low negative sentiment polarity indicates that the page is generally liked by the users. On the other hand, a high negative sentiment polarity in conjunction with a low positive sentiment polarity indicates that the page is generally disliked by the users. The positivity and negativity are tracked through time, and in some cases, they are also correlated with certain events and holidays (e.g., Hurricane Sandy, Election, Thanksgiving, Christmas, etc.) that help provide additional data that may be impacting the user sentiment at that point in time. For example, the retailer page has a high positivity and a low negativity during the holiday season (Thanksgiving, Christmas, etc.), indicating that the retailer has received positive feedback from users during that time period. This information is useful for the retailer, for example, to study user preferences to better target certain user groups. For example, the retailer may identify from the insight page a certain user group showing a higher positivity than others. This allows the retailer to do targeted advertising on this user group and during the time period where the positivity is generally high and advertising tends to be effective (e.g., the holiday season).

FIG. 7B shows percentage of polarized posts on the retailer page as a function of time. Polarized posts refer to those posts having a nonzero sentiment polarity. A polarized post is either positive (having a positive sentiment polarity) or negative (having a negative sentiment polarity), and thus a higher percentage of polarized posts might indicate popular, or alternatively, controversial content. The curve 730 illustrates the percentage of polarized posts overall (including positive and negative posts) out of all posts, while the curves 740 and 750 illustrate the percentage of positive posts and negative posts out of all posts, respectively. For example, on Nov. 23, 2012 (indicated by point 735), 77% of all the posts on the page are polarized, in which 55% are positive posts and 22% are negative posts. The top curve 740 shows that the positive sentiment polarity was lower on that date, and the bottom curve 750 shows that the negative sentiment polarity was higher on that date. The retailer page owner may want to further investigate the content on the page that day to determine why sentiment polarity went down overall. FIG. 7B further shows that the percentages of polarized posts, positive posts, and negative posts may each be correlated with certain user or retailer actions, such as uploading a photo on the page or publishing a post on the page. This information is useful for the retailer, for example, to study users' reactions to a post or a photo on a certain topic. For instance, if more positive posts emerge following a post by the retailer featuring a store-wide discount, the retailer may learn that many users like discounts and may do that more often in the future.

FIG. 7C shows percentage of polarized users interacting with the retailer page as a function of time. Polarized users are those users with the most polarized sentiment polarity, e.g., the top 20% most positive or negative. The curve 760 illustrates the percentage of polarized users (including positive and negative users) out of all users, while the curves 770 and 780 illustrate the percentage of positive polarized users and negative polarized users out of all users, respectively. For example, on Dec. 12, 2012 (indicated by point 765), 20% of all the users interacting with the retailer page are polarized, in which 13% are positive polarized users and 7% are negative polarized users. As shown in FIG. 7C, the percentages of polarized users, positive polarized users, and negative polarized users each may be correlated with certain events and holidays (e.g., Hurricane Sandy, Election, Thanksgiving, Christmas, etc.).

This information allows a direct view of the number of users who strongly like or dislike the retailer page, which provides a complementary insight allowing the retailer to refine their market strategies. For example, the retailer may learn from FIG. 7A that there is a high positivity together with a low negativity, and from FIG. 7B that there are more positive posts than negative posts. From these two insights, the retailer may conclude that "things are going well." Based on the additional insight, the retailer may have to modify their previous conclusion and refine their market strategies. As illustrated above, analytics based on sentiment polarities of users provide valuable insight (e.g., user preferences, market penetration by user group, etc.) for the retailer as well as the social networking system.

In some embodiments, the users' gender and age may be filtered or otherwise broken out to provide analytics focused on various user group (e.g., male between the ages of 18-24, female above the age 65, etc.). These demographic filters may be selected by a viewing user.

In one embodiment, an insight page may include analytics focusing on a single user, or a group of users. For example, an insight page may show a single user's sentiment polarity toward a given page as a function of time. In this example, a consistent trend of the user's sentiment polarity may be identified. For instance, the user may consistently display a positive sentiment polarity (i.e., a "lover"), consistently display a negative sentiment polarity (i.e., a "hater"), or display a changing sentiment polarity (e.g., switching from a lover to a hater, or vice versa). In one implementation, a newly inferred sentiment polarity of the user is identified as an aberrant entry if it does not follow the consistent trend. For example, the user has been known as a "lover" on a certain topic, but a lexicon-based analysis on a recent comment from the user yields a negative sentiment toward this topic. Knowing that the user is a "lover" helps the social networking system to identify such "mistakes." On the other hand, a newly inferred sentiment polarity of the user is identified as a correct entry if it follows the consistent trend. In addition, based on the consistent trend of the user's sentiment polarity, the social networking system may determine that the user has switched from a "lover" to a "hater," or vice versa. This may provide insight for targeted advertising. For example, if a user has gradually shifted from a "lover" of a brand to a "hater" of the brand, the social networking system may consider advertising an alternative brand (e.g., a competitor of the previous brand) to the user.

In one embodiment, the social networking system may determine that the user has a below-threshold sentiment polarity toward the content of a page. For example, the user may have a negative sentiment polarity, or a sentiment polarity below 0.2 (e.g., slightly positive), toward a page which talks about football. In this case, the social networking system determines that the user is not a fan of the content of the page—football in this example—and disqualifies sponsored stories or other candidate stories that are related to football (e.g., a story of some of the user's friends participating in a recent football game) from being sent to the user through, for example the newsfeed manager 230.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    identifying text content of a page of a social networking system;
    extracting a topic from the text content;
    identifying users of the social networking system associated with a strong sentiment polarity toward the topic as a set of trusted users for the extracted topic;
    determining a training data set for each trusted user, the training data set comprising information about one or more interactions performed by the trusted user with the topic and the trusted user's sentiment polarity;
    training a machine learning model using the training data sets of the trusted users, the machine learning model configured to infer sentimental polarities of users based on interactions performed by the users;
receiving information about a first interaction between a user of the social networking system not included in the set of trusted users and the page;
inferring a sentiment polarity of the user toward the extracted topic based on the received information about the first interaction using the machine learning model, the sentiment polarity indicating a positive or negative sentiment of the user toward the topic;
storing the inferred sentiment polarity of the user toward the extracted topic in a social graph;
receiving a second interaction from the user related to the extracted topic;
retrieving the user's stored sentiment polarity toward the extracted topic;
determining that the second interaction has the same stored sentiment polarity of the user toward the extracted topic based on the second interaction being from the same user as the first interaction;
inferring an updated sentiment polarity of the user based on the received information about the second interaction using the machine learning model;
storing the updated sentiment polarity of the user toward the extracted topic in the social graph;
comparing the updated sentiment polarity to a threshold value;
responsive to the updated sentimental polarity exceeding the threshold value, identifying the user as a trusted user associated with the topic; and
training the machine learning model using an updated training data set of trusted users including the identified user.

2. The method of claim 1, wherein the text content comprises at least one of posts or comments.

3. The method of claim 1, wherein the topic is extracted from the text content using lexicon-based analysis.

4. The method of claim 1, wherein the received information further comprises information about a separate interaction between another user with whom the user has established a connection in the social networking system and the page, and the sentiment polarity of the user is further inferred based on the information about the separate interaction.

5. The method of claim 1, further comprising:
receiving information about a separate interaction between another user in the social networking system and the interaction; and
inferring the sentiment polarity of the user based on information about the separate interaction.

6. The method of claim 1, further comprising:
receiving information about a separate interaction between the user and another interaction between another user in the social networking system and the page; and
inferring the sentiment polarity of the user based on the information about the separate interaction.

7. The method of claim 1, further comprising:
adding the sentiment polarity to an insight page, the insight page comprising statistical analytics on the page and providing insight for predicting future trends based on the statistical analytics.

8. The method of claim 7, further comprising:
identifying a consistent trend of the user's sentiment polarity toward the content of the page based on the insight page;
determining whether the inferred sentiment polarity follows the consistent trend; and
responsive to determining that the inferred sentiment polarity does not follow the consistent trend, identifying the inferred sentiment polarity as an aberrant entry.

9. The method of claim 8, further comprising:
responsive to determining that the inferred sentiment polarity follows the consistent trend, identifying the inferred sentiment polarity as a correct entry.

10. The method of claim 7, further comprising:
identifying a consistent trend of the user's sentiment polarity toward the content of the page based on the insight page; and
determining that the user has switched between a person displaying a negative sentiment polarity toward the content of the page and a person displaying a positive sentiment polarity toward the content of the page based on the consistent trend.

11. The method of claim 1, wherein inferring by a computer system that the user has a sentiment polarity toward the extracted topic based on the received information about the first interaction comprises:
determining a type of the first interaction from a plurality of different types of interactions; and
inferring the sentiment polarity based on the determined type of the first interaction.

12. A computer-implemented method comprising:
identifying content of a page of a social networking system;
identifying users of the social networking system associated with a strong sentiment polarity toward the content as a set of trusted users for the content;
determining a training data set for each trusted user, the training data set comprising information about one or more interactions performed by the trusted user with the content and the trusted user's sentiment polarity;
training a machine learning model using the training data sets of the trusted users, the machine learning model configured to infer sentimental polarities of users based on interactions performed by the users;
receiving information about a first interaction between a user of the social networking system not included in the set of trusted users and the page;
inferring a sentiment polarity of the user toward the content based on the received information about the first interaction using the machine learning model, the sentiment polarity indicating a positive or negative sentiment of the user toward the content of the page;
storing the inferred sentiment polarity of the user toward the content of the page in a social graph;
receiving a second interaction from the user related to the content;
retrieving the user's stored sentiment polarity toward the content of the page;
determining that the second interaction has the same stored sentiment polarity of the user toward the content of the page based on the second interaction being from the same user as the first interaction;
inferring an updated sentiment polarity of the user based on the received information about the second interaction using the machine learning model;
storing the updated sentiment polarity of the user toward the content of the page in the social graph;
comparing the updated sentimental polarity to a threshold value;

responsive to the updated sentimental polarity exceeding the threshold value, identifying the user as a trusted user associated with the content; and training the machine learning model using an updated training data set of trusted users including the identified user.

13. The method of claim 12, wherein the first interaction comprises at least one of liking, crossing-out, sharing, hiding, reporting, or commenting.

14. The method of claim 12, further comprising:
disqualifying sponsored stories related to the content of the page when the sentiment polarity of the user falls below a threshold.

15. The method of claim 12, wherein the step of identifying the set of trusted users comprises:
receiving a third interaction between a second user of the social networking system and the page, the third interaction comprising the second user liking the page;
determining that the second user has a positive sentiment polarity toward the content of the page; and
adding the second user to a set of positive trusted users associated with the content of the page, the set of positive trusted users forming a subset of the set of trusted users.

16. The method of claim 12, wherein the step of identifying the set of trusted users comprises:
receiving an indication that a positive trusted user likes a comment on the page from an outside user, wherein the outside user does not belong to the set of trusted users and the comment has not been analyzed;
analyzing the comment to obtain a sentiment polarity of the comment toward the content of the page;
determining that the sentiment polarity of the comment is above a threshold sentiment polarity;
determining that the outside user has a positive sentiment polarity toward the content of the page; and
adding the outside user to a set of positive trusted users associated with the content of the page, the set of positive trusted users forming a subset of the set of trusted users.

17. The method of claim 12, wherein the step of identifying the set of trusted users comprises:
identifying an outside user who likes a set of comments on the page, wherein the outside user does not belong to the set of trusted users;
determining that the set of comments has more than a threshold number of comments;
determining that more than a threshold percentage of the set of comments is from the set of positive trusted users;
determining that the outside user has a positive sentiment polarity toward the content of the page; and
adding the outside user to a set of positive trusted users associated with the content of the page, the set of positive trusted users forming a subset of the set of trusted users.

18. The method of claim 12, wherein the step of identifying the set of trusted users comprises:
receiving a set of comments from an outside user on the page, wherein the outside user does not belong to the set of trusted users;
analyzing each comment from the set of comments to obtain a sentiment polarity of said each comment toward the content of the page;

determining that the set of comments comprises a subset of comments, wherein each comment from the subset of comments has a sentiment polarity below a threshold sentiment polarity;
determining that the number of comments within the subset of comments exceeds a threshold number;
determining that the outside user has a negative sentiment polarity toward the content of the page; and
adding the outside user to a set of negative trusted users associated with the content of the page, the set of negative trusted users forming a subset of the set of trusted users.

19. The method of claim 16, wherein analyzing the comment comprises using lexicon-based analysis.

20. The method of claim 18, wherein each comment from the set of comments is analyzed using lexicon-based analysis.

21. The method of claim 12, wherein the training set is independent of language.

22. The method of claim 12, further comprising:
associating each trusted user's comments related to the content of the page with said each trusted user's sentiment polarity; and
forming a separate training set for training a bag-of-words sentiment analyzer, the separate training set comprising a set of comments from the trusted users in conjunction with each comment's sentiment polarity.

23. The method of claim 12, wherein inferring by the computer system a sentiment polarity of the user based on the received information about the first interaction comprises:
determining a type of the first interaction from a plurality of different types of interactions; and
inferring the sentiment polarity based on the determined type of the first interaction.

24. A computer-implemented method comprising:
identifying content of a page of a social networking system;
identifying users of the social networking system associated with a strong sentiment polarity toward the content as a set of trusted users for the content;
determining a training data set for each trusted user, the training data set comprising information about one or more interactions performed by the trusted user with the content and the trusted user's sentiment polarity;
training a machine learning model using the training data sets of the trusted users, the machine learning model configured to infer sentimental polarities of users based on interactions performed by the users;
receiving information about a first interaction between a non-trusted user of the social networking system and the page;
inferring a first sentiment polarity of the non-trusted user based on the received information about the first interaction using the machine learning model, the sentiment polarity indicating a first sentiment of the non-trusted user toward the content of the page;
storing the inferred first sentiment polarity of the non-trusted user toward the content of the page in a social graph;
receiving a second interaction from a trusted user related to the content indicating a second sentiment polarity toward the first interaction by the non-trusted user;
retrieving the non-trusted user's stored first sentiment polarity toward the content of the page;
determining the trusted user's second sentiment polarity toward the content of the page is different from the non-trusted user's first sentiment polarity toward the content of the page based on the second interaction from the trusted user;
adjusting the non-trusted user's first sentiment polarity toward the content in a direction corresponding to the second sentiment polarity indicated by the trusted user responsive to determining that the first sentiment polarity is different from the second sentiment polarity; and
storing, in connection with the second interaction, the adjusted first sentiment polarity of the non-trusted user toward the content of the page in the social graph.

25. The method of claim 24, wherein inferring by the computer system a first sentiment polarity of the non-trusted user based on the received information about the first interaction comprises:
determining a type of the first interaction from a plurality of different types of interactions; and
inferring the sentiment polarity based on the determined type of the first interaction.

26. A computer program product comprising a non-transitory computer-readable storage medium containing computer program code for:
identifying text content of a page of a social networking system;
extracting a topic from the text content;
identifying users of the social networking system associated with a strong sentiment polarity toward the topic as a set of trusted users for the extracted topic;
determining a training data set for each trusted user, the training data set comprising information about one or more interactions performed by the trusted user with the topic and the trusted user's sentiment polarity;
training a machine learning model using the training data sets of the trusted users, the machine learning model configured to infer sentimental polarities of users based on interactions performed by the users;
receiving information about a first interaction between a user of the social networking system not included in the set of trusted users and the page;
inferring a sentiment polarity of the user toward the extracted topic based on the received information about the first interaction using the machine learning model, the sentiment polarity indicating a positive or negative sentiment of the user toward the topic;
storing the inferred sentiment polarity of the user toward the extracted topic;
receiving a second interaction from the user related to the extracted topic;
retrieving the user's stored sentiment polarity for the extracted topic;
determining that the second interaction has the same stored sentiment polarity of the user toward the extracted topic based on the second interaction being from the same user as the first interactions;
inferring an updated sentiment polarity of the user based on the received information about the second interaction using the machine learning model;
comparing the updated sentimental polarity to a threshold value;
responsive to the updated sentimental polarity exceeding the threshold value, identifying the user as a trusted user associated with the topic; and
training the machine learning model using an updated training data set of trusted users including the identified user.

27. The computer program product of claim 26, wherein the computer program code for inferring by the computer system a sentiment polarity of the user based on the received information about the first interaction comprises computer program code for:
determining a type of the first interaction from a plurality of different types of interactions; and
inferring the sentiment polarity based on the determined type of the first interaction.

28. A computer program product comprising a non-transitory computer-readable storage medium containing computer program code for:
identifying content of a page of a social networking system;
identifying users of the social networking system associated with a strong sentiment polarity toward the content as a set of trusted users for the content;
determining a training data set for each trusted user, the training data set comprising information about one or more interactions performed by the trusted user with the content and the trusted user's sentiment polarity;
training a machine learning model using the training data sets of the trusted users, the machine learning model configured to infer sentimental polarities of users based on interactions performed by the users;
receiving information about a first interaction between a user of the social networking system not included in the set of trusted users and the page;
inferring by a computer system a sentiment polarity of the user based on the received information about the first interaction, the sentiment polarity indicating a positive or negative sentiment of the user toward the content of the page;
storing the inferred sentiment polarity of the user toward the content of the page;
receiving a second interaction from the user related to the content;
retrieving the user's stored sentiment polarity for the extracted topic;
determining that the second interaction has the same stored sentiment polarity of the user toward the content of the page based on the second interaction being from the same user as the first interaction;
inferring an updated sentiment polarity of the user based on the received information about the second interaction using the machine learning model;
storing the updated sentiment polarity of the user toward the content of the page in the social graph;
comparing the updated sentimental polarity to a threshold value;
responsive to the updated sentimental polarity exceeding the threshold value, identifying the user as a trusted user associated with the content; and
training the machine learning model using an updated training data set of trusted users including the identified user.

29. The computer program product of claim 28, wherein the computer program code for inferring by the computer system a sentiment polarity of the user based on the received information about the first interaction comprises computer program code for:
determining a type of the first interaction from a plurality of different types of interactions; and
inferring the sentiment polarity based on the determined type of the first interaction.

* * * * *